(12) United States Patent
Rave (10) Patent No.: US 8,798,174 B2
(45) Date of Patent: Aug. 5, 2014

(54) METHOD AND DEVICE FOR QUANTIZING LIKELIHOOD QUOTIENTS

(75) Inventor: Wolfgang Rave, Freital-Pesterwitz (DE)

(73) Assignee: Vodafone Holding GmbH, Düsseldorf (DE)

( * ) Notice: Subject to any disclaimer, the term of this patent is extended or adjusted under 35 U.S.C. 154(b) by 564 days.

(21) Appl. No.: 13/121,360

(22) PCT Filed: Sep. 25, 2009

(86) PCT No.: PCT/DE2009/075053
§ 371 (c)(1),
(2), (4) Date: May 13, 2011

(87) PCT Pub. No.: WO2010/034309
PCT Pub. Date: Apr. 1, 2010

(65) Prior Publication Data
US 2011/0206166 A1   Aug. 25, 2011

(30) Foreign Application Priority Data

Sep. 26, 2008  (EP) .................................... 08165233

(51) Int. Cl.
*H04B 14/04* (2006.01)
(52) U.S. Cl.
USPC .......................................... 375/243; 375/316
(58) Field of Classification Search
USPC .................................................. 375/243, 316
See application file for complete search history.

(56) References Cited

U.S. PATENT DOCUMENTS

| | | | |
|---|---|---|---|
| 2006/0041203 A1* | 2/2006 | Wolf et al. | 600/544 |
| 2009/0016415 A1* | 1/2009 | Chakrabarti et al. | 375/214 |
| 2009/0268833 A1* | 10/2009 | Ariyavisitakul et al. | 375/262 |
| 2009/0279442 A1* | 11/2009 | Rave | 370/246 |

OTHER PUBLICATIONS

Khattak et al., "Distributed Iterative Multiuser Detection through Base Station Cooperation", EURASIP Journal on Wireless Communications and Networking (2008).
Chakrabarti et al., "Code Designs for Cooperative Communication", IEEE Signal Processing Magazine, pp. 16-26 (2007).

* cited by examiner

*Primary Examiner* — Chieh M Fan
*Assistant Examiner* — Freshteh N Aghdam
(74) *Attorney, Agent, or Firm* — Edwards Wildman Palmer LLP; Peter F. Corless; Steven M. Jensen (57) ABSTRACT

A method in signal processing is used for quantizing likelihood quotients of binary random variables for transmitting between at least two signal processing units. Decision levels and reconstruction levels of a quantization of likelihood quotients are thereby determined by maximizing corresponding information between the binary random variables and the associated quantized likelihood quotients at a prescribed probability distribution of the likelihood quotients. A corresponding quantization device determines decision levels and reconstruction levels of a quantization of the likelihood quotients by maximizing the corresponding information between the binary variables and the associated quantized likelihood quotients at a prescribed probability density of the likelihood quotients.

9 Claims, 6 Drawing Sheets

|  | a | b | c |
|---|---|---|---|
| $\tilde{R}=3, r_1$ | 0.4473 | 0.2896 | 0.1075 |
| $\tilde{R}=3, r_2$ | 0.0865 | 0.4861 | 0.0955 |
| $\tilde{R}=3, d_1$ | 0.238 | 0.4082 | -0.01667 |
| $\tilde{R}=4, r_1$ | 0.1395 | 0.1261 | -0.01083 |
| $\tilde{R}=4, r_2$ | 0.8214 | 0.6343 | 0.08864 |
| $\tilde{R}=4, d_1$ | 0.35 | 0.6589 | -0.02219 |
| $\tilde{R}=5, r_1$ | 0.2361 | 0.1248 | -0.01938 |
| $\tilde{R}=5, r_2$ | 0.9179 | 0.7357 | 0.08219 |
| $\tilde{R}=5, d_1$ | 0.1895 | 0.3223 | -0.01140 |
| $\tilde{R}=5, d_2$ | 0.3824 | 0.8387 | -0.03581 |
| $\tilde{R}=6, r_1$ | 0.1299 | 0.1331 | -0.009314 |
| $\tilde{R}=6, r_2$ | 0.8313 | 0.6499 | -0.02541 |
| $\tilde{R}=6, r_3$ | 1.031 | 0.8188 | 0.07718 |
| $\tilde{R}=6, d_1$ | 0.2813 | 0.3607 | -0.01879 |
| $\tilde{R}=6, d_2$ | 0.4586 | 0.8588 | -0.03378 |
| $\tilde{R}=8, r_1$ | 0.1358 | 0.08752 | -0.008295 |
| $\tilde{R}=8, r_2$ | 0.3794 | 0.3377 | -0.01973 |
| $\tilde{R}=8, r_3$ | 0.5314 | 0.7521 | -0.03236 |
| $\tilde{R}=8, r_4$ | 1.179 | 0.8661 | 0.07172 |
| $\tilde{R}=8, d_1$ | 0.2737 | 0.189 | -0.01278 |
| $\tilde{R}=8, d_2$ | 0.4993 | 0.4998 | -0.02707 |
| $\tilde{R}=8, d_3$ | 0.611 | 1.063 | -0.0398 |

METHOD AND DEVICE FOR QUANTIZING LIKELIHOOD QUOTIENTS

CROSS-REFERENCES TO RELATED APPLICATIONS

This application is a 35 U.S.C. §371 U.S. national entry of International Application PCT/DE2009/075053 having an International filing date of Sep. 25, 2009, which claims priority of European Patent Application 08165233.5 filed on Sep. 26, 2008, the contents of each of said applications being incorporated into this description by reference.

TECHNICAL FIELD

The invention concerns a method during a signal processing for quantization of likelihood quotients of binary random variables for a transmission between two or more signal processing units.

Furthermore, the invention concerns a quantization device during a signal processing for quantization of likelihood quotients of binary random variables for a transmission between two or more signal processing units.

PRIOR ART

There are many known signal processing procedures in which interconnected signal processing units exchange probabilities in order to carry out certain tasks in a signal processing chain or make possible an iterative signal processing. One example of such signal processing is a decoding of turbo code, which are used in mobile radio networks of the third generation (such as UMTS). In this example, two decoders each generate a hypothesis regarding a received pattern of useful bits. For this, probabilities or so-called likelihood values are derived and used. The decoders exchange the likelihood values and each of them generates a new hypothesis, taking into account the likelihood values of the other decoder. This process is repeated iteratively until both decoders furnish the same hypothesis for the pattern of useful bits.

Often so-called log-likelihood quotients are generated and exchanged as probability values between different signal processing units. The log-likelihood quotient of a binary random variable $X \in \{+1, -1\}$ is defined as:

$$L_x(x) = \log \frac{P_x(x = +1)}{P_x(x = -1)}$$

Here, $P_x(x)$ describes the probability that the random variable X takes on the value x. Random variables like X or L(X) are denoted here with capital letters and their realization x, l with lower case letters. By "log" is meant the natural logarithm. The log-likelihood quotient L(X) is also termed the L value or LLR (log-likelihood ratio) of the random variable X hereafter. The value domain of L(X) extends from $-\infty$ to $+\infty$. The sign in front of L(X) is the decision whether x=+1 or x=-1. This decision is also known as a hard decision. The magnitude |L(X)| describes the reliability of this decision.

The distribution of L values in the value domain $\pm\infty$ or the density of the L values depends on the noise occurring in a channel used for transmission of x values. For a Gaussian channel, there is a bimodal Gaussian distribution of L values.

Since for the mean $\mu$ and variance $\sigma^2$ we have the relation $\mu_L = \sigma^2_L/2$, the LLR density $p_L(l)$ depends only on one quantity, $\sigma_L$ or $\sigma^2$:

$$p_L(l) = \frac{1/2}{\sqrt{2\pi}\,\sigma_L}\left[\exp\left(-\frac{\left(l - \frac{\sigma_L^2}{2}\right)^2}{2\sigma_L^2}\right) + \exp\left(-\frac{\left(l + \frac{\sigma_L^2}{2}\right)^2}{2\sigma_L^2}\right)\right]$$

The assumption of a Gaussian channel holds for AWGN (additive white Gaussian noise) or flat Rayleigh channels and also approximately in general for large data block lengths.

The L values must be transmitted with finite accuracy between different signal processing units for the digital processing. The quantization step needed for this causes unavoidable quantization noise, which can be equated to an information loss in the processing system. In general, a scalar quantization maps continuous L values onto a limited set of R discrete values $r_i$, which are known as quantization values, quantization levels, or reconstruction levels. For this purpose, D(=R+1) threshold values or decision levels $d_i$ are determined in the value domain $\pm\infty$ of the L values. An L value in an interval $[d_i, d_{i+1}]$ is mapped onto the corresponding reconstruction level $r_i$. In the following, the terms reconstruction level and decision level shall be used.

By increasing the number R of reconstruction levels $r_i$, the information loss is reduced at the cost of an additional data transfer and processing expense. For this reason, the number R of reconstruction levels $r_i$ is limited. A further reduction of the information loss is possible by a suitable setting of the reconstruction level $r_i$ and the decision level $d_i$. On the other hand, an adequate quantization enables an advantageous reduction of the data rate.

In a bimodal Gaussian distribution of the L values, a uniform quantization with uniform intervals $[d_i, d_{i+1}]$ and reconstruction levels $r_i$ in the middle of this interval leads to sizeable errors or a high quantization noise. Many different L values are mapped onto reconstruction levels $r_i$ of a few intervals, while other reconstruction levels $r_i$ are only seldom used. In particular, a probability distribution of the L values and an information content of the L values are not taken into account. The quantization errors are propagated, especially with an iterative signal processing, and have negative impact on the overall signal processing course.

A known nonuniform quantization method for scalar quantities is the Lloyd-Max quantization according to S. Lloyd, "Least squares quantization in PCM", (unpubl. Bell Lab. Techn. Note, 1957) IEEE Trans. Inf. Theory, vol. IT-28, pp. 129-137, 1982, and J. Max, "Quantizing for minimum distortion", IEEE Trans. Inf. Theory, vol. 6, pp. 7-12, 1960. In this quantization, the mean square error (MSE) between the probability densities of continuous and quantized values is minimized. For this, the decision levels $d_i$ and the reconstruction levels $r_i$ are adjusted accordingly in several iteration steps. In the case of log-likelihood quotients, this procedure unfortunately leads to many levels being used for L values with large magnitudes in order to keep the mean square error low, although a change in the reliability is already very small for these L values.

In the publication of S. Khattak, W. Rave and G. Fettweis, "Distributed Iterative Multiuser Detection through Base Station Cooperation", EURASIP J. on Wireless Comm and Networking Volume 2008, Article ID 390489, another nonuniform quantization is described for log-likelihood quotients. So-called "soft bits" $\Lambda(X) = E\{X\} = \tan h(L(X)/2)$ are used to represent the L values. Thanks to this transformation, the value domain is confined to [−1, 1] and a saturation is achieved for increasing reliability or large magnitude of L values. The Lloyd-Max quantization is now applied to an expression for the "soft bit" density to determine suitable decision levels $d_i$ and reconstruction levels $r_i$. By this technique, the levels $d_i$ and $r_i$ are better adapted to an existing distribution and an information content of the L values.

However, there continues to be a need for a more optimal quantization method for log-likelihood quotients in order to minimize errors in the signal processing and the labor expense. In particular, the mean square error between continuous and quantized log-likelihood quotients is not the optimal criterion for a determination of decision levels $d_i$ and reconstruction levels $r_i$.

DISCLOSURE OF THE INVENTION

The problem of the invention is therefore to avoid the drawbacks of the prior art and to optimize a mutual coordination of data rate and accuracy in a quantization of likelihood quotients for a transmittal.

According to the invention, the problem is solved with a method of the kind mentioned at the outset in a signal processing for quantization of likelihood quotients of binary random variables for a transmission between two or more signal processing units by determination of decision levels and reconstruction levels of a quantization of the likelihood quotients by a maximization of the mutual information between the binary random variables and the corresponding quantized likelihood quotients for a given probability distribution of the likelihood quotients.

Furthermore, the problem is solved with a quantization device of the kind mentioned at the outset in a signal processing for quantization of likelihood quotients of binary random variables for a transmission between two or more signal processing units by providing means for determination of decision levels and reconstruction levels of a quantization of the likelihood quotients by a maximization of the mutual information between the binary random variables and the corresponding quantized likelihood quotients for a given probability distribution of the likelihood quotients.

The mutual information between the binary variables and the quantized likelihood quotients can be represented, for a given probability distribution or probability density, as a function of the reconstruction and decision levels. According to the invention, the corresponding information is maximized prior to a quantization of the likelihood quotients by varying the reconstruction and decision levels. For this, one can use a method of steepest drop-off or another suitable numerical optimization method, for example.

Such a direct optimization of the reconstruction and decision levels in regard to the maximum mutual information according to the method of the invention and the device of the invention minimizes the loss of mutual information during the quantization. Therefore, advantageously, less quantization noise occurs upon transmittal of quantized likelihood quotients between signal processing units. For the same data rate of a transmittal, the loss of mutual information is less and a signal processing is carried out much more accurately. On the other hand, a reduction in data rate is possible thanks to fewer levels for the same loss of mutual information, so that the signal processing can be run more quickly and with less expense.

One advantageous embodiment of the method of the invention in a signal processing for quantization of likelihood quotients is accomplished by detecting a variance of the likelihood quotients prior to a quantization for the determining of reconstruction and decision levels. The variance is suitable, for example in a bimodal Gaussian distribution, such as occurs in AWGN channels or flat Rayleigh channels, to describe the probability distribution or probability density of the likelihood quotients. Thus, for a quantization, one can optimally determine reconstruction and decision levels that are adapted to a given variance of the likelihood quotients. The loss in mutual information by a quantization is minimized each time according to an existing variance.

Another preferred embodiment of the method of the invention calls for adapting an approximation function as a function of the variance to reconstruction levels and decision levels determined for different variances and determining of reconstruction levels and decision levels for a quantization by the approximation function. In this case, for example, a corresponding approximation function is used for one, several, or all reconstruction and decision levels. This technique makes possible a fast and uncomplicated determination of optimal levels in dependence on a given variance. A time-consuming and elaborate maximization of the mutual information by a suitable optimization method does not have to be carried out before each quantization.

Preferably, in one embodiment of the method of the invention, a table of values and/or an interpolation is used when determining reconstruction levels or decision levels. This is possible, e.g., in addition to or alternatively to an approximation function. In this way, a determination of optimal levels in the sense of maximum mutual information can also be carried out quickly and without costly optimization methods prior to a quantization.

Moreover, in an advantageous modification of the method of the invention, an entropy encoding of reconstruction levels is carried out. In a quantization with maximization of the mutual information, one obtains reconstruction levels that are used with different probability. By an entropy encoding, level labels or bit patterns of differing length are coordinated with the reconstruction levels. A prefix-free code is used for this, and more frequently occurring reconstruction levels receive a shorter level label. As the entropy encoding, a Huffman encoding is used, for example. In this way, a data compression is achieved for the reconstruction levels being transmitted. This leads to an effective reduction of the data rate during a transmittal of quantized likelihood quotients.

One advantageous embodiment of the quantization device of the invention in a signal processing for quantization of likelihood quotients is achieved in that the approximation means for adapting an approximation function as a function of the variance to reconstruction levels or decision levels determined for different variances and a level generator for determining of reconstruction levels and decision levels for a quantization with the approximation function are provided. As in the corresponding embodiment of the method of the invention, this avoids a time and resource-consuming maximization of the mutual information by an optimization process. Optimal levels are determined quickly and easily in dependence on a given variance.

Further embodiments of the quantization device of the invention correspond to the already described embodiment of the method of the invention and possess the corresponding benefits.

Moreover, further embodiments and benefits will emerge from the subject of the subclaims, as well as the drawings with corresponding description.

A sample embodiment of the invention is explained more closely below, making reference to the corresponding drawings.

PREFERRED SAMPLE EMBODIMENT

In the following, we shall first explain more closely the mathematical foundations and expressions and then describe as an example a method for quantization of likelihood quotients, along with a corresponding quantization device.

Mutual information or transinformation is a quantity from information theory that is familiar to the specialist. It indicates the strength of the statistical correlation of two random quantities. The mutual information I(X;L) between two variables x and l describes the mean reduction in uncertainty of x when l is known, and vice versa. This is described, for example, in Thomas M. Cover, Joy A. Thomas, "Elements of Information Theory" 2nd. ed., John Wiley & Sons, 2006. The mutual information is used here to determine the average information loss of binary data during a quantization of corresponding L values. With a given set of reconstruction levels $r_i$ and decision levels $d_i$, the mutual information l(X;L) between the binary variables $X\in\{+1,-1\}$ and the corresponding quantized discrete L value density, as well as the non-quantized continuous L value density can be calculated. The mutual information for a continuous density is:

$$I_C(X;L) = \sum_{i=\pm 1} \int \frac{p(l|x)}{2} ld \frac{2p(l|x)}{p(l|x=1)+p(l|x=-1)} dl$$

For a Gaussian channel, integration can be done for the quantized, discrete case. The mutual information between X and the corresponding quantized log-likelihood quotients with sum written out in terms of both possible bit values of the information bit $X\in\{+1,-1\}$ can be represented as:

$$I_q(X;L) = \frac{1}{4}\sum_{i=1}^{R}[1-ld(1+e^{-r_1})]\mathrm{erf}\left(\frac{l-\mu_L}{\sqrt{2}\sigma_L}\right)\Big|_{d_i}^{d_{i+2}}$$

-continued $$\ldots + [1-ld(1+e^{r_1})]\mathrm{erf}\left(\frac{l+\mu_L}{\sqrt{2}\sigma_L}\right)\Big|_{d_i}^{d_{i+2}}$$

Instead of the error function eft(x), the standard normal distribution can also be used. The logarithm base 2 is denoted as "ld". With $\mu_L=\sigma_L^2/2$, this equation for given number R of reconstruction levels and given variance $\sigma_L^2$ or standard deviation $\sigma_L$ of the L values describes the mutual information $I_q(X;L)$ in dependence on the reconstruction levels $r_i$ and decision levels $d_i$.

The difference $\Delta I=-I_c-I_q$ between the two kinds of mutual information represents the information loss from the quantization. The derivatives with respect to the reconstruction levels $r_i$ for $1\leq i\leq R$ are:

$$\frac{\partial I_q}{\partial r_i} = \frac{1}{4\ln 2}\frac{e^{-r_i}}{1+e^{-r_i}}\mathrm{erf}\left(\frac{l-\mu_L}{\sqrt{2}\sigma_L}\right)\Big|_{d_i}^{d_{i+2}} - \frac{1}{4\ln 2}\frac{e^{r_1}}{1+e^{r_1}}\mathrm{erf}\left(\frac{l+\mu_L}{\sqrt{2}\sigma_L}\right)\Big|_{d_i}^{d_{i+2}}$$

The derivatives with respect to the decision levels $d_i$ for $1\leq i\leq R$ are:

$$\frac{\partial I_q}{\partial d_i} = \frac{1}{2\sqrt{2\pi}\sigma_L} ld \frac{1+e^{-r_i}}{1+e^{-r_{i-s}}}\exp\left(-\frac{(d_i-\mu_L)^2}{2\sigma_L^2}\right) \ldots +$$
$$\frac{1}{2\sqrt{2\pi}\sigma_L} ld \frac{1+e^{r_i}}{1+e^{r_{i-s}}}\exp\left(-\frac{(d_i+\mu_L)^2}{2\sigma_L^2}\right)$$

To minimize the information loss $\Delta I$, the mutual information $I_q$ of the quantized L value density must be maximized. For a given variance $\sigma_L^2$ and a given number R of reconstruction levels, a maximization of the mutual information $I_q$ is accomplished by corresponding adapting of the reconstruction levels $r_i$ and decision levels $d_i$.

Figure 1:
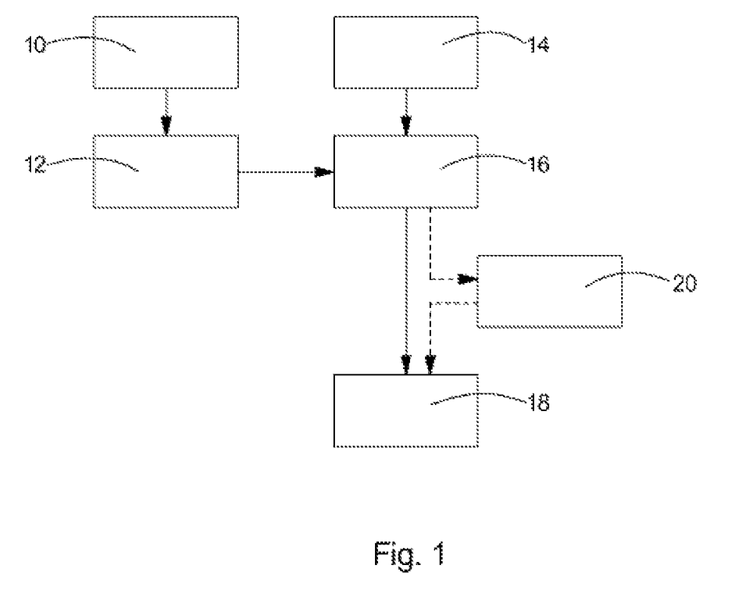
FIG. 1 shows in a schematic flow chart a sample embodiment of the method of the invention.

FIG. 1 shows a schematic flow chart of a sample embodiment. In a first step of the method, a steepest decline method or another suitable numerical optimization method is used to maximize the mutual information $I_q$, box 10. For this, in a corresponding quantization device, means are provided for determining of reconstruction and decision levels by maximization of the mutual information. Thanks to the maximization of the mutual information $I_q$, optimized reconstruction levels $r_i$ and decision levels $d_i$ are obtained in regard to a minimal information loss $\Delta I$.

Figure 2:
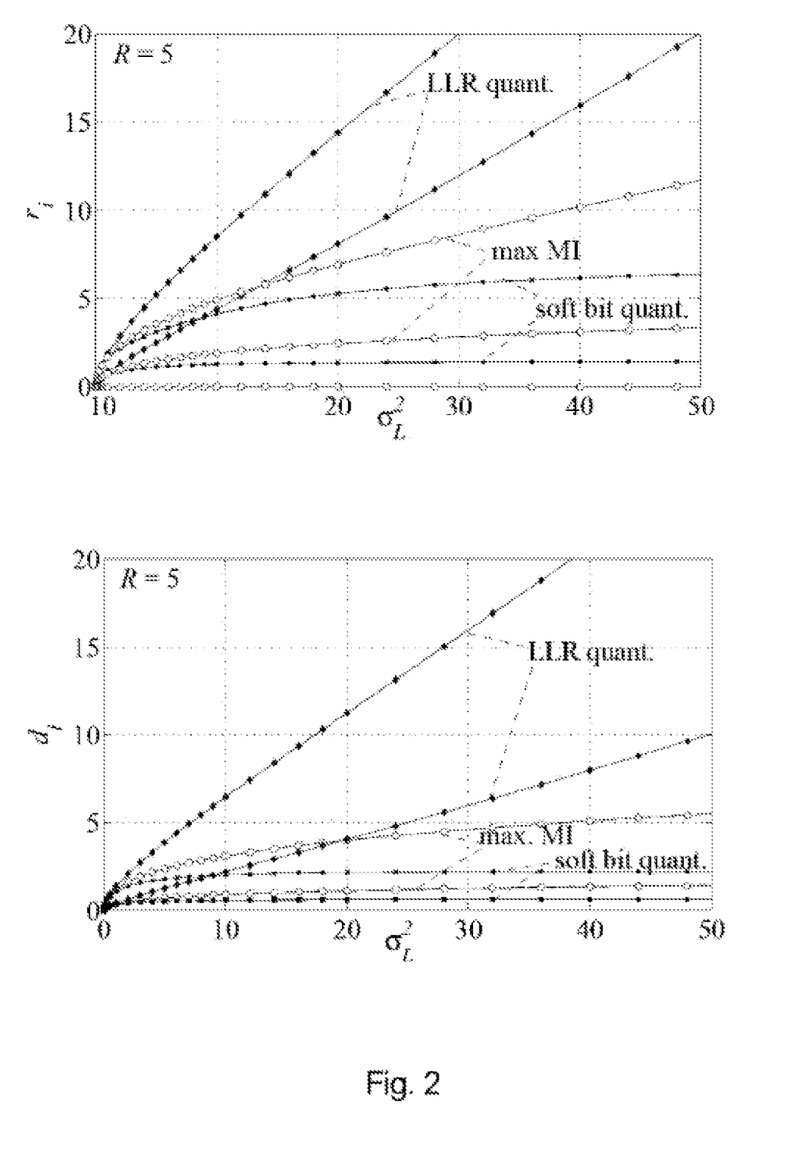
FIG. 2 shows a comparison of reconstructions levels $r_i$ and decision levels $d_i$ for R=5 reconstruction levels, which are optimized by a method for maximization of the mutual information, a Max-Lloyd method applied directly to the L values, and Max-Lloyd method applied to "soft bits" of the L values.

In the diagrams of FIG. 2, reconstruction levels $r_i$ and decision levels $d_i$ determined by such a maximization are shown by clear circles (β) as an example for R=5 and several variances $\sigma_L^2$ and denoted by "max MI" for "Maximum Mutual Information". For R=5 reconstruction levels, the decision levels $d_1$ and $D_{R+1}$ have the values $\pm\infty$, while the other four decision levels have finite values. For reasons of symmetry, for both the reconstruction levels and the decision levels there occur two pairs of levels whose values differ only in sign. Therefore, only positive levels are shown in FIG. 2. Moreover, when R=5, a reconstruction level is always equal to zero, regardless of the L value variance. For comparison, FIG. 2 shows corresponding reconstruction levels and decision levels after a direct Lloyd-Max quantization of the L values (LLR quant.) and a Lloyd-Max quantization of "soft bits" (soft bit. quant.).

One clearly notices in FIG. 2 an anticipated saturation of the levels after the soft bit quantization with increasing variance $\sigma_L^2$ and, thus, larger magnitude of the L values. This is less pronounced in the maximization of the mutual information. Besides the advantageous optimization of the levels directly by the nonlinear expression for the mutual information, a new and usable degree of freedom results from this quantization thanks to an independent optimization of the decision levels. The decision levels no longer need to lie in the middle between two reconstruction levels. In this way, a substantial reduction of the loss of mutual information during the quantization is achieved.

Figure 3:
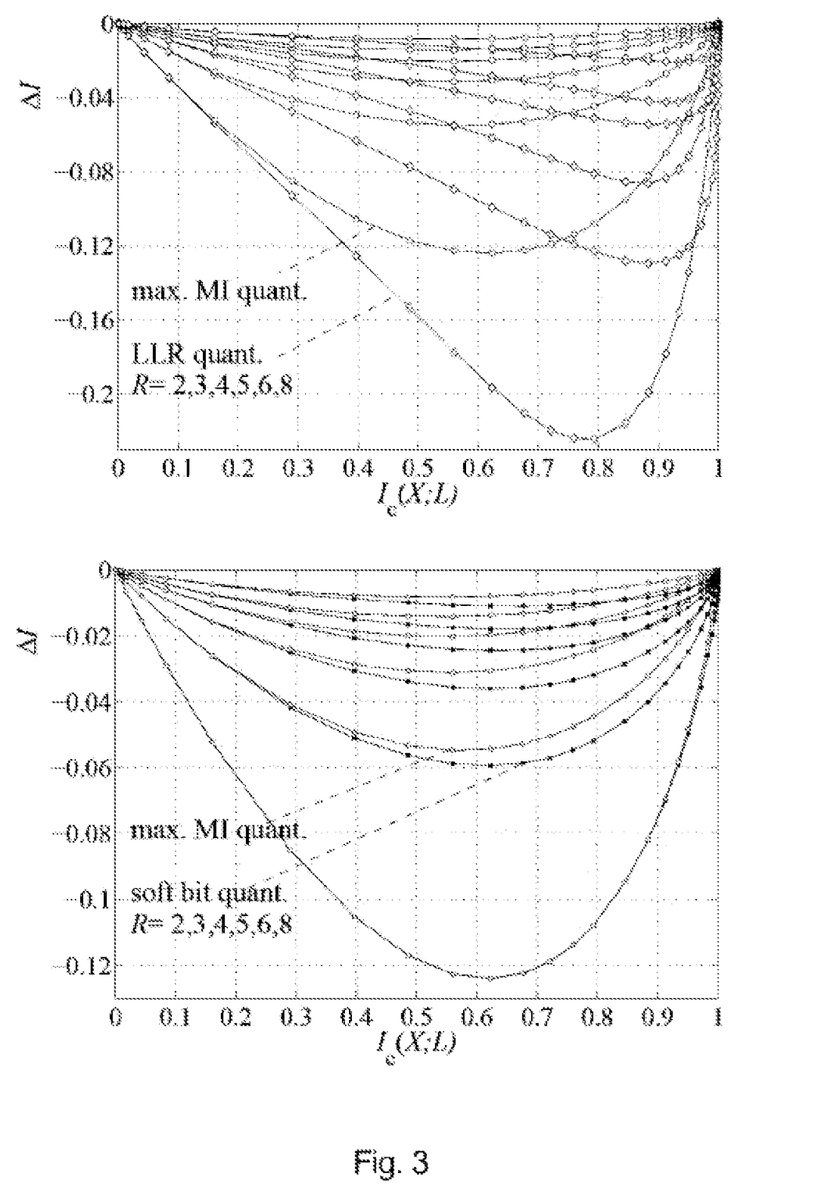
FIG. 3 shows a comparison of the loss of mutual information $\Delta I$ between quantized L values and nonquantized L values as a function of the mean mutual information $I_C$ for R=2–8 reconstruction levels. Quantizations with maximization of the mutual information are compared with a direct quantization of the L values and a quantization of "soft bits" of the L values, each time by a Lloyd-Max method.

In FIG. 3, the decrease in mutual information ΔI between quantized and nonquantized L values is shown as a function of the mean mutual information of the L values for R=2, 3, 4, 5, 6, 8 reconstruction levels. In one diagram, the quantization by maximization of the mutual information (max. MI quant.) is compared with the direction quantization of the L values (LLR quant.). The great reduction in the loss of mutual information is clearly evident when the LLR-based quantization is replaced by the maximization of the mutual information. The reduction decreases with growing number R of levels. The other diagram of FIG. 3 compares the quantization by maximization of the mutual information (max. MI quant.) with the "soft bit" quantization (soft bit quant.). With the "soft bit" quantization, a distinct reduction in the decrease in mutual information as compared to the direct LLR quantization can already be achieved. In comparing the two diagrams, one must take note of the different scale of the Y axis. Even so, thanks to the quantization by means of maximization of the mutual information the loss in mutual information is further reduced by up to ¼ as compared to "soft bit" quantization. This is especially attributable to the separate optimization of the decision levels, as is apparent from the case of R=2. When R=2, this additional degree of freedom is not yet provided, so that the two quantization methods are basically equivalent.

In another step of the method, box 12, a suitable approximation function of the variance $\sigma_L^2$ or the standard deviation $\sigma_L$ is adapted to certain values, determined by maximization of the mutual information, of a reconstruction level $r_i$ or decision level $d_i$ for different variances $\sigma_L^2$. For this, the quantization device has approximation means available. In this sample embodiment, $f(\sigma_L) = a\sqrt{\sigma_L} + b\sigma_L + c\sigma_L^2$ is used as the approximation function for all levels. In FIG. 2, appropriately adapted functions $f(\sigma_L)$ are shown as lines for two reconstruction levels and two decision levels. For an adaptation, suitable coefficients a, b and c are determined for a level. With a given number R of reconstruction levels and R+1 decision levels, a determination of the coefficients a, b, and c is not necessary for each level on account of the symmetry. Instead, the number of necessary adaptations is cut in half. Moreover, $d_1 = -\infty$, $d_{R+1} = +\infty$, $r_{(R+1)/2} = 0$ for odd R and $d_{R/2+1} = 0$ for even R, regardless of the variance $\sigma_L^2$.

Figure 4:
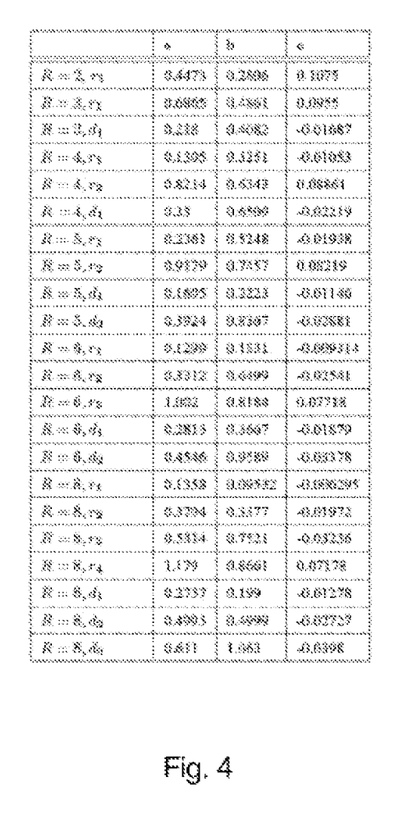
FIG. 4 shows a table with adapted coefficients a, b, and c of the approximation function: $f(\sigma_L)=a\sqrt{\sigma_L}+b\sigma_L+c\sigma_L^2$ for reconstruction levels and decisions levels with R=2, 3, 4, 5, 6, 8 reconstruction levels.

The table of FIG. 4 shows all necessary coefficients a, b, and c for R=2, 3, 4, 5, 6, 8 reconstruction levels. With the help of the approximation functions for each reconstruction and decision level, a quick and uncomplicated determination of optimal levels in dependence on a give variance $\sigma_L^2$ is made possible. A time-consuming and laborious maximization of the mutual information $I_q$ by a suitable numerical optimization method, such as a method of steepest decline, does not have to be done before each quantization.

In an alternative embodiment, instead of the approximation function $f(\sigma_L)$ with corresponding coefficients there is specified a use of a table of values for all reconstruction and decision levels for as many different variances $\sigma_L^2$ as possible and a suitable interpolation. In this way as well, a determination of optimal levels in the sense of maximum mutual information and in dependence on $\sigma_L^2$ can be done quickly and without laborious optimization methods before a quantization.

Before a quantization of L values, one first determines the variance $\sigma_L^2$ or the standard deviation $\sigma_L$ of the L values with a detection unit, box 14. Using the approximation function $f(\sigma_L)$ and the corresponding coefficients a, b and c, one then establishes optimal reconstruction levels $r_i$ and decision levels $d_i$ in terms of the mutual information, depending on $\sigma_L^2$ or $\sigma_L$, by a level generator, box 16. Finally, a quantization, box 18, of the L values is done using these reconstruction levels $r_i$ and decision levels $d_i$ by a quantization unit. The steps 14, 16 and 18 of the method are carried out once more, for example, during an iterative signal processing, for each occurring quantization of L values.

In what follows, these method steps shall be explained as an example using a turbo decoding of a parallel concatenated convolutional code (PCCC). For comparison, a direct quantization of L values per Lloyd-Max is also used and the influence of a quantization method for L values on a signal processing is demonstrated.

As the PCCC code, a simple recursive systematic PCCC with generators G=[1.5/7], block length N=2000 and a random interleaver with pointing to achieve a rate ½ is used. Such a code is known to the specialist, for example, from Thomas M. Cover, Joy A. Thomas, "Elements of Information Theory" 2nd. ed., John Wiley & Sons, 2006. For the decoding, a BCJR algorithm is used, while the maximum-log-MAP (MAP: maximum a posteriori probability) approximation basically leads to the same results as the exact log-MAP version. In this case, the extrinsic information present at one output of the decoder is exchanged between two cooperating decoders. For this, a quantization of the L values of the extrinsic information is needed.

At first, the variance of the L values is adaptively determined at the MAP decoder output with the detection means. The measured variance of |L(X)|, the absolute L value of the code bits, is then mapped onto the variance $\sigma_L^2$. Using the approximation function and the respective valid coefficients a, b and c (see FIG. 3), reconstruction levels $r_i$ and decision levels $d_i$ are then determined from the variance $\sigma_L^2$ so determined.

For this, the level generator is used in the quantization device. The levels determined are thus optimized in dependence on the variance to maximize the mutual information. Finally, a quantization of the L values with the ascertained reconstruction levels $r_i$ and decision levels $d_i$ is performed by the quantization unit. This procedure is used for each decoding iteration. For variances greater than $\sigma_L^2 = 100$, the levels for this value are used and the current L value distribution is scaled appropriately to obtain information on the relative magnitude among the L values. The iteration can also be broken off at this point.

Figure 5:
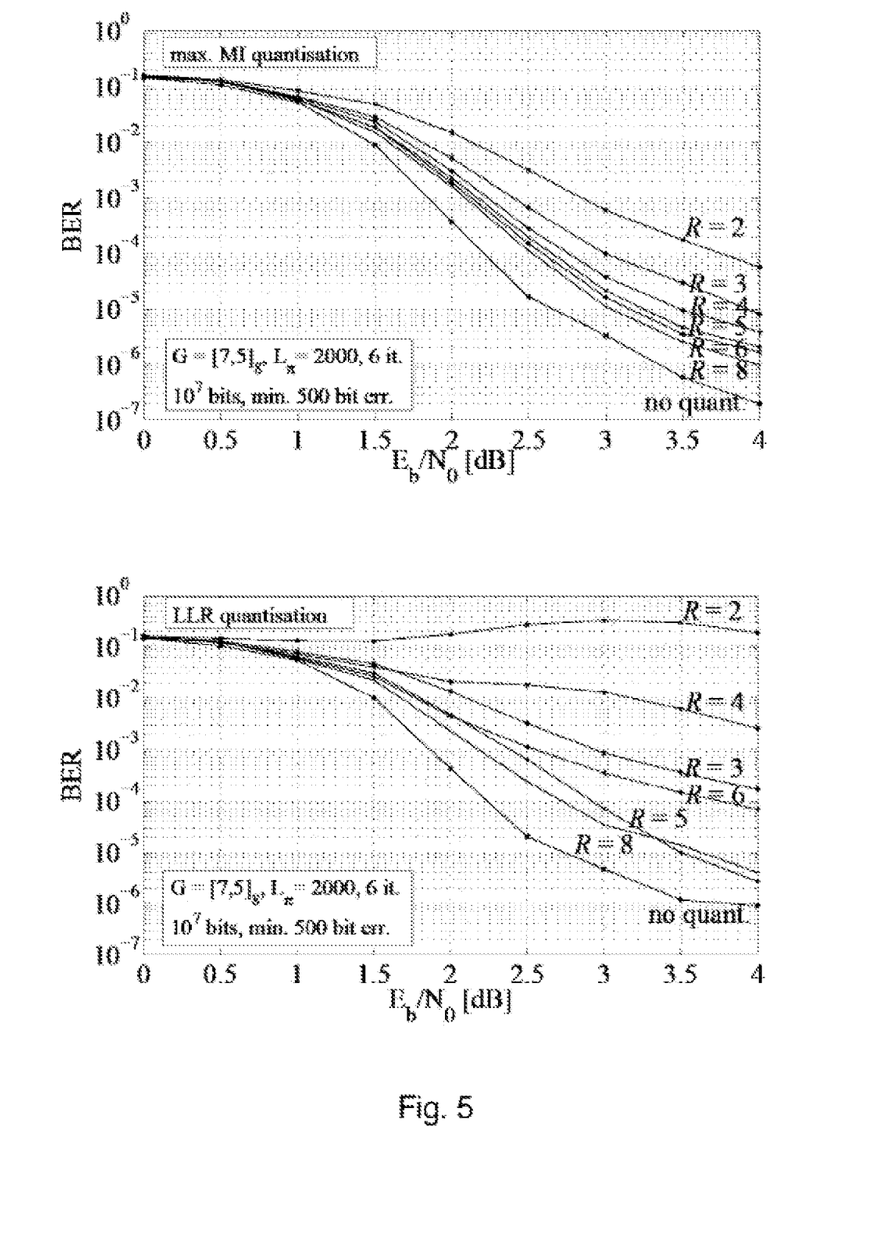
FIG. 5 shows bit error rates of a log-MAP decoding of a PCC code (G=[1.5/7], block length N=2000, AWGN channel) using a quantization by maximization of the mutual information as compared to use of a direct L value quantization after Lloyd-Max.

For comparison, decodings are performed with different R (number of reconstruction levels) during the quantization and instead of the quantization by means of maximization of the mutual information a direct quantization of the L values by the Lloyd-Max method is also done. FIG. 5 shows the bit error rate (BER) of the individual decodings as a function of the bit energy/noise power density ratio Eb/N0. The ratio of the energy Eb used for an information bit to the spectral noise power density N0 relates the signal/noise ratio to an information bit. With increasing noise, i.e., decreasing Eb/N0, the bit error rate usually increases. In the top diagram, the bit error rates are shown for various R and Eb/N0 when using the quantization with maximization of the mutual information (max. MI quantisation). The decrease in the bit error rate with increasing R is clearly evident. As reference (no quant.), the nonquantized representation of a priori information is used. The bottom diagram shows bit error rates for corresponding R and Eb/N0 when using the direct Lloyd-Max quantization for the L values. This quantization generally leads to a larger bit error rate than the Max-MI quantization.

In another sample embodiment, an entropy encoding, box 20, of the reconstruction levels is done by means of an entropy encoder of the quantization unit. Entropy encodings are known to the specialist, for example, from A. Gersho, R. M. Gray, "Vector Quantization and Signal Compression", Boston, Mass., Kluwer, 1992 and Thomas M. Cover, Joy A. Thomas, "Elements of Information Theory" 2nd. ed., John Wiley & Sons, 2006. The quantization to maximize the mutual information, as well as the "soft bit" quantization, produce reconstruction levels that are used with different probability. The areas under the bimodal Gaussian density are different for each reconstruction level. The reconstruction levels are assigned level labels or bit patterns of different length. A prefix-free code is used and frequently used reconstruction levels are given a shorter level label. In this way, a data compression and, consequently, an effective reduction of the data rate are achieved.

A lower limit for the required average label length is given by the entropy of the reconstruction levels:

$$H_R(L_q) = -\sum_{i=1}^{R} P_i \log P_i + (1 - P_i)\log(1 - P_i)$$

Figure 6:
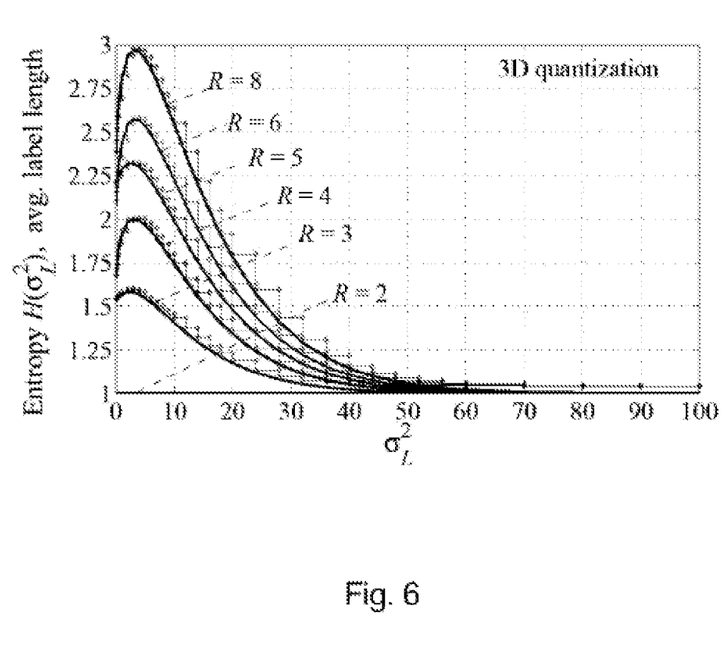
FIG. 6 shows the entropy of L values that are quantized with maximization of the mutual information $L_q(X;L)$ as a function of $\sigma_L^2$ (solid lines) and an average label length (steps) achievable with a three-dimensional Huffman encoding.

FIG. 6 shows $H_R(L_q)$ as a function of the variance $\sigma_L^2$ for various R (number of reconstruction levels) by solid lines. The entropy encoding is done, e.g., by a three-dimensional Huffman encoding. Three L values are represented jointly in the sense of a vector quantization. The average label length for various R and $\sigma_L^2$ is shown as a step function over the entropy curve in FIG. 6. But one can also use a different dimension or a different encoding method. As an example, a quantization of the bimodal Gaussian L value distribution is considered here with R=4 reconstruction levels by maximization of the mutual information. For $\sigma_L^2=10$, the entropy of the level probabilities is H=1.743 bits and a 1-, 2-, or 3-dimensional Huffman encoding leads to an average label length of 1.816, 1.775 and 1.746 bits. When the variance of the L values increases to $\sigma_L^2=20$, the entropy drops to H=1.340 bits, which is approximated by a 1-, 2-, or 3-dimensional Huffman encoding with respectively 1.595, 1.368 and 1.363 bits. Higher dimensions with corresponding code letters are also possible.

The invention claimed is:

1. A method in a signal processing for quantization of likelihood quotients of binary random variables for a transmission between two or more signal processing units, comprising:
    determining, by a quantization device, decision levels and reconstruction levels of a quantization of the likelihood quotients by a maximization of corresponding information between the binary random variables and the corresponding quantized likelihood quotients for a given probability distribution of the likelihood quotients.

2. A method in a signal processing for quantization of likelihood quotients according to claim 1, comprising detecting, by the quantization device, a variance of the likelihood quotients prior to the quantization for the determining of the reconstruction and decision levels.

3. A method in a signal processing for quantization of likelihood quotients according to claim 2, further comprising:
    adapting, by the quantization device, an approximation function as a function of the variance to the reconstruction levels and decision levels determined for different variances; and
    determining, by a level generator, the reconstruction levels and decision levels for a quantization by the approximation function.

4. A method in a signal processing for quantization of likelihood quotients according to claim 1, comprising a memory with a table of values or an interpolation unit for determining the reconstruction levels or decision levels.

5. A method in a signal processing for quantization of likelihood quotients according to claim 1, wherein the quantization device is configured to carry out an entropy encoding of the reconstruction levels.

6. A quantization device in a signal processing for quantization of likelihood quotients of binary random variables for a transmission between two or more signal processing units, comprising:
    means for determination of decision levels and reconstruction levels of a quantization of the likelihood quotients by a maximization of corresponding information between the binary random variables and the corresponding quantized likelihood quotients for a given probability distribution of the likelihood quotients; and
    a detection unit for detecting a variance of the likelihood quotients prior to the quantization for the determining of the reconstruction and decision levels.

7. A quantization device in a signal processing for quantization of likelihood quotients according to claim 6, further comprising:
    approximation means for adapting an approximation function as a function of the variance to the reconstruction levels and decision levels determined for different variances; and
    a level generator for determining the reconstruction levels and decision levels for a quantization with the approximation function.

8. A quantization device in a signal processing for quantization of likelihood quotients according to claim 6, wherein the quantization device comprises a memory with a table of values or an interpolation unit for determining the reconstruction levels or decision levels.

9. A quantization device in a signal processing for quantization of likelihood quotients according to claim 6, wherein an entropy encoder is provided for the reconstruction levels.

* * * * *